March 16, 1965 P. JEAN-MARIE T. ALLARD 3,173,559
LOADING MECHANISM
Filed May 7, 1962 4 Sheets-Sheet 1
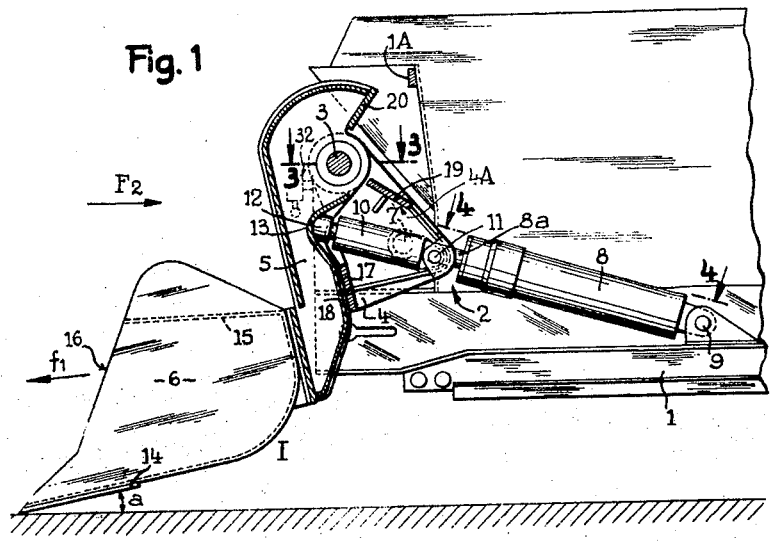
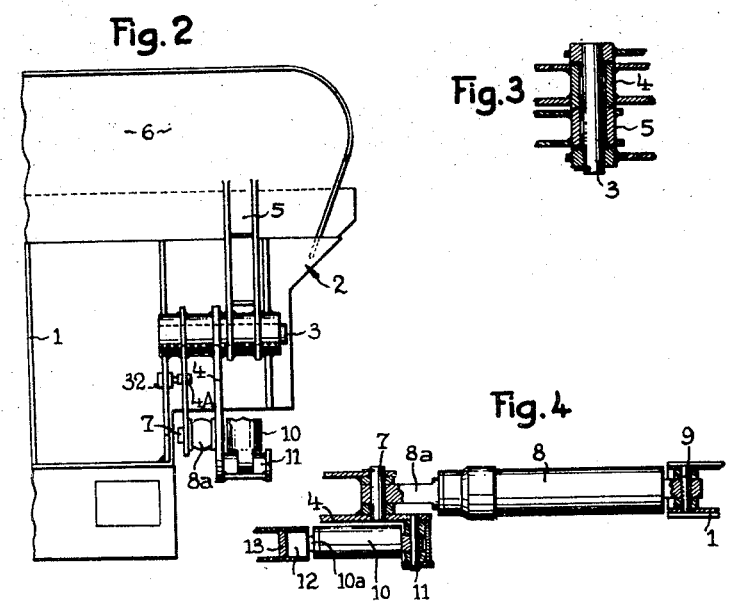
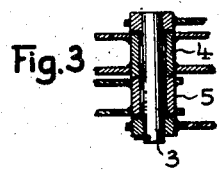
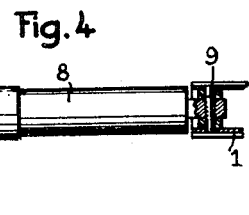
INVENTOR:
Pierre Jean-Marie Théodore Allard
BY E. M. Squire March 16, 1965   P. JEAN-MARIE T. ALLARD   3,173,559
LOADING MECHANISM
Filed May 7, 1962   4 Sheets-Sheet 4

INVENTOR:
Pierre Jean-Marie Théodore Allard
BY E. M. Squire 3,173,559
LOADING MECHANISM
Pierre Jean-Marie Théodore Allard, 3 Rue de Constantine,
Paris, France
Filed May 7, 1962, Ser. No. 192,649
Claims priority, application France, May 8, 1961,
861,165, Patent 1,296,649
7 Claims. (Cl. 214—91)

The present invention has for its object a shovel control mechanism intended for use on shovelling machines of any suitable type and, more particularly, to shovelling machines wherein the skip or shovel member is advanced forwardly to pick up a load of material which is subsequently unloaded rearwardly upon a conveyor or other receiving device.

My invention includes an unloading arrangement adapted to flip the material carried by the skip onto receiving means in a manner such that the material being unloaded will be distributed over a comparatively large area without collecting immediately below the discharge position of the skip. To obtain this result, I provide an unloading mechanism wherein the skip is abruptly stopped at the end of its discharge travel in a manner such that, through momentum, the load will be flipped or tossed rearwardly out of the skip.

My invention also covers an arrangement wherein the skip while satisfying the above-described unloading requirements, moves forwardly during shovelling at a comparatively reduced speed with reference to ground.

These various requirements are satisfied by my improved arrangement comprising a longitudinally movable chassis which is secured to a shovelling machine or incorporated with such a machine, a first support pivotally secured to the chassis for rotation about a horizontal axis, a first hydraulic jack pivotally secured to said first support to control its angular displacement, a second support pivotally mounted for rotation about the same horizontal axis as the first support so as to rotate in unison therewith under the action of the first jack, said second support being connected to the first jack, while a second jack hydraulic pivotally secured to the first support engages the second support to pivot the latter with reference to the first support in a manner such that upon subjection to said two rotations in succession, the skip may continue its rotation under the action of momentum, so as to abut against a stationary stop and consequently project its contents rearwardly of the shovelling machine.

According to further features of my invention:

The first jack is pivotally connected, on the one hand, with the chassis and, on the other hand, with a portion of the first support;

The two supports pivot about the same horizontal axis;

The arrangement is symmetrical and each support includes two parallel arms arranged symmetrically of a longitudinal medial vertical plane, while each support is controlled by a pair of identical hydraulic jacks arranged symmetrically and each acting individually on one of the arms of the corresponding support;

The two pairs of jacks are energized in parallel by a common source of pressure fluid and the piston area of the first or shovelling jacks controlling the arms of the first support is much larger than that of the second or reversing jacks controlling the movements of the arms of the second support with reference to the arms of the first support in a manner such that during the first stage of operation of the arrangement, the shovelling jacks operate alone under the action of the pressure fluid, while the second jacks operate only subsequently so as to make the skip rock with reference to the shovelling support;

The arrangement includes an oil and air energy accumulator which is operative during the second stage of operation so as to reinforce the action of said second jacks.

Further features and advantages of my invention will appear from the reading of the following specification, reference being made to the accompanying drawings wherein:

FIG. 1 is a side elevational view of my improved loading mechanism partly shown in section.

FIG. 2 is a front fragmentary view of the mechanism looking in the direction of the arrow F2 of FIG. 1, the skip being in its raised position.

FIG. 3 is a fragmentary plan sectional view taken along the line 3—3 of FIG. 1.

FIG. 4 is a fragmentary sectional view taken along the line 4—4 of FIG. 1.

Figure 5:
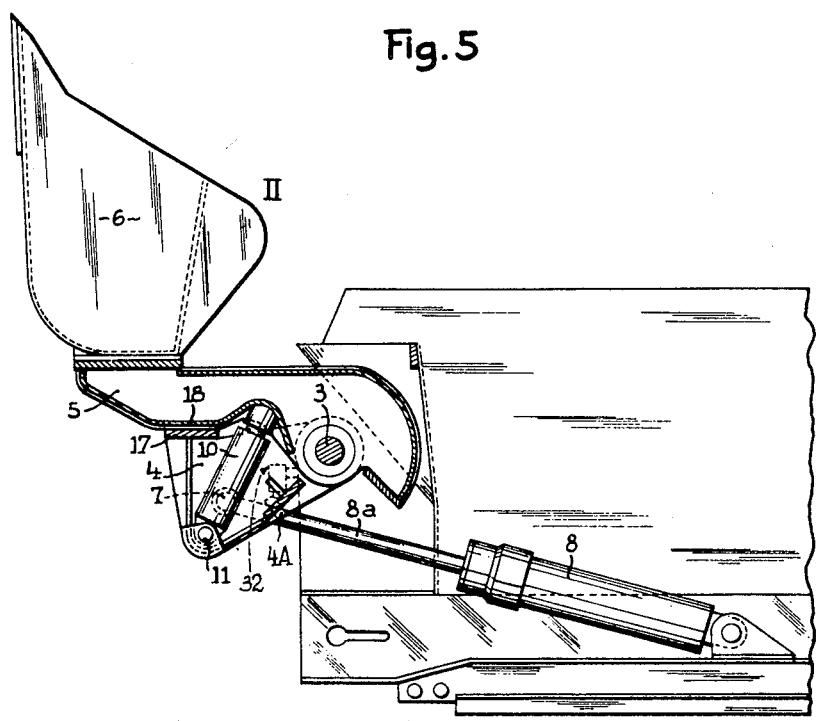
FIG. 5 is a view similar to FIG. 1 illustrating the mechanism in a second position.

In the embodiment illustrated in the drawings, the chassis 1 which may form part of a shovelling machine, carries a loading device which is symmetrical with reference to the longitudinal medial vertical plane of the chassis. The chassis 1 is provided with two transverse horizontal spindles 3 arranged in axial alignment symmetrically with reference to the longitudinal axis of the chassis, only one of said spindles being illustrated in FIG. 2. On each of said spindles 3 there is a freely pivotally mounted a first arm 4 or shovelling arm and a second arm 5 or skip arm, the two skip arms 5 being rigidly secured to a shovelling skip 6 carried between said two last-mentioned arms 5 and 5.

Each of the two shovelling arms 4 is connected through a spindle 7 with the piston rod 8a of a double acting hydraulic jack 8, the body of which is pivotally secured to the chassis by a pivot pin 9.

Each shovelling arm 4 carries a single acting secondary hydraulic jack 10 of which the body is pivotally secured by a pivot pin 11 to shovelling arm 4 while its piston rod 10a terminates in a spherical abutment 12 engaging a complementary shaped recess 13 formed in its associated skip arm.

The skip 6 forms a loading skip of a conventional shape arranged and designed however in a manner such that its leading edge 14 engages the ground during the loading movement executed in the direction of the arrow f1 and forms an angle a with the ground such that the unevennesses of the ground surface cannot make the skip 6 dig into the ground. The skip 6 also includes a dorsal strip or wall member 15 defining the loading opening 16 for the skip and forming with the leading edge an angle of small magnitude for reasons to be disclosed hereinafter.

Each shovelling arm 4 is provided with a stop 17 adapted to be engaged by the rear surface 18 of the corresponding skip arm 5. When the skip 6 is in the shovelling position illustrated in FIG. 1, said rear surface 18 of the skip arm 5 is urged against the stop 17 of shovelling arm 4 under the action of the torque produced by the shovelling stress exerted by the chassis in the direction of the arrow f1, which urges the skip into the pile of material to be loaded. Each shovelling arm 4 further includes a second stop 19 positioned to cooperate with a projection 20 provided on the skip arm 5. Lastly, two stops 1A are provided on the chassis, against which the skip arms 5 abut abruptly at the end of their rotary discharging movement, which corresponds to the position illustrated in dot-and-dash lines in FIG. 6 as disclosed hereinafter.

Figure 7:
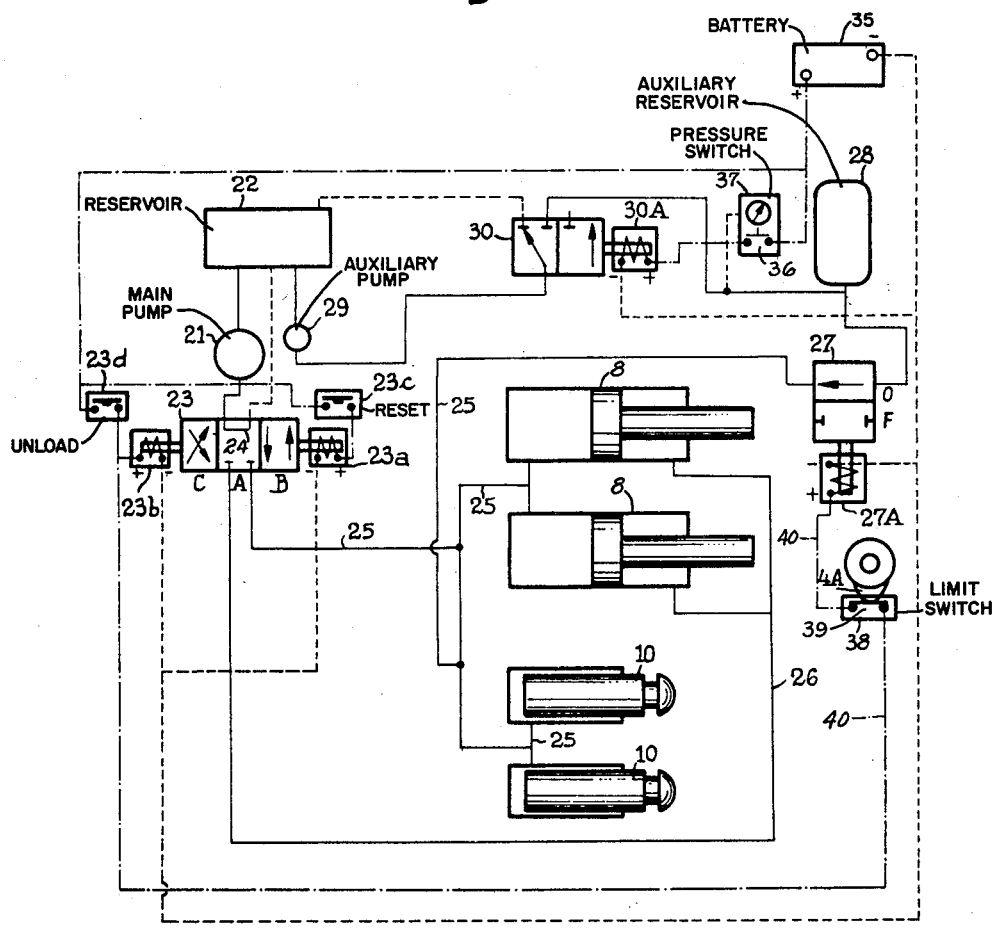
FIG. 7 is a diagram of the hydraulic and electrical circuits controlling the mechanism.

The movements of the pair of primary shovelling jacks 8 and of the pair of secondary jacks 10 which complete the unloading movement of the skip, are controlled by a hydraulic circuit, of which the component elements are illustrated diagrammatically in FIG. 7.

In said circuit, a main pump 21 supplies a reservoir 22 which is reversibly connected for operation of the system through a three-way slide valve 23, electrically connected for remote control by solenoids 23a and 23b which are selectively energized through push-buttons or switches 23c and 23d manually controlled by the operator of the machine. The main hydraulic jacks 8 which control the shovelling operation and the auxiliary jacks 10 operating the skip during its terminal angular displacement are controlled by the three-way valve 23. For the neutral position A of the slide valve, said slide valve establishes, as illustrated, the closed idling circuit of the pump and the pressure fluid returns directly into the reservoir 22 through the by-pass channel 24 within the movable member of the valve 23. Upon shifting of the slide valve towards the unloading position illustrated at C by energization of solenoid 23b, the pump 21 feeds in parallel four jacks, i.e. the two auxiliary jacks 10 and the two main jacks 8 through the manifold pipes 25, spent pressure fluid passing out of the piston rod ends of jacks 8 and returning through the manifold channel 26 to the reservoir 22. When the slide valve 23 is shifted towards the reset position C by energization of solenoid 23a, the jacks 8 are fed by the channel 26, while spent pressure fluid is returned to reservoir 22 through manifold pipe or channel 25.

The manifold channel 25 is extended, through further solenoid valve 27 which is provided with an operating winding 27A, to an auxiliary oil and air storage reservoir 28.

An auxiliary pump 29 is connected with the auxiliary storage container 28 through a solenoid valve 30 controlled by an electromagnet 30A which is energized by a power source such as battery 35 through contacts 36 of a pressure-controlled switch 37, so as to restore full pressure in the auxiliary storage container 28 between successive unloading operations. The solenoid valve 27 is provided with a closed position F and an open position O.

The auxiliary single acting jacks 10 have a cross-sectional effective piston area which is small as compared to that of the main jacks 8, whereby the fluid pressure actuates the shovelling jacks 8 without displacing the auxiliary skip jacks 10.

Lastly, the arrangement described includes a limit switch 38 the contacts 39 of which are connected in series with the "UNLOAD" push button 23d controlled by the operator. The limit switch 38 is arranged at a suitable point of the path of a stop or dog 4A carried by the shovelling arm 4. The closing of limit switch 38 closes a circuit through conductor 40 energizing the electromagnet 27A so as to open the solenoid valve 27 which controls, in its turn, the connection and disconnection of the auxiliary oil and air storage reservoir 28 to and from the manifold 25.

The operation of the device is as follows:

Assume that the skip 6 is at the beginning of its operative cycle, that is in the position I illustrated in FIG. 1 and has engaged the heap of material by forward movement of the chassis 1 of the shovelling machine in the direction of the arrow f1, that is under the action of the driving wheels, caterpillar tracks, self-laying tracks or other propulsion mechanism (not shown). The shovelling arms 4 are then in abutting relationship through their bearing surfaces 18 engaging the stops 17 on the skip arms 5.

In the hydraulic circuit shown in FIG. 7, the solenoid slide valve 23 is then in its neutral position A.

Assuming now that the operator closes the circuit of the shovelling electromagnet 23a by pressing the "UNLOAD" button 23d, the slide valve 23 enters the operative position C, the pump 21 will feed the pipe 25, the shovelling jacks 8 being subjected thus to a pressure on the surface of its pistons having a large cross-sectional area while the single acting jacks 10 are also subjected to pressure. The four jacks have then a tendency to urge their piston rods towards the left-hand side of FIG. 1 but only the jacks 8 of which the piston area is larger than that of the jacks 10 are actuated and the movable system constituted by the shovelling arms and the skip arms including the skip is driven as a unit solely by the sole action of the shovelling jacks 8. Said movement is performed in a comparatively slow manner so as to ensure a proper filling of the skip through angular displacement of the arms 4 on the pivot formed by the spindle 3. The necessary force is supplied in practice only by the shovelling jacks 8 having a larger piston area.

The rotation of said arrangement leads it into the position illustrated in FIG. 5 wherein the two pairs of arms remain in contact with each other, the skip arms extending in a substantially horizontal position while the skip load is kept inside the upwardly opening skip, so that said load cannot possibly escape during this rotary movement.

When the shovelling jacks 8 reach their position of complete expansion, that is when they abut mechanically against their stops, the whole arrangement being in the position II illustrated in FIG. 5, all of the fluid flow delivered by the pump 21 becomes effective for the jacks 10 controlling the separate angular displacement of the skip and by reason of their smaller cross-section, these jacks 10 are subjected to a sudden acceleration of their movements as they urge back the arms 5 carrying the skip. On the other hand, the shovelling arms 4, when they reach the end of their movement, close the limit switch 38, which causes the energization of the electromagnet 27A. The magnet 27 controls in its turn the valve 27 so as to open the connection with the auxiliary oil and air storage container 28, whereby pressure fluid with within said storage container is released. The volume of fluid which is allowed to enter the jacks 10 is increased, whereby a very high acceleration of said jacks is obtained and the action of said jacks is consequently increased on the arms 5 carrying the skip. Said arms 5 are then carried along at a comparatively high angular velocity pivoting on the spindle 3 and are shifted away from the shovelling arms 4 by angular displacement with reference to the latter. This high angular velocity continues until the jacks 10 arrive in their turn at the end of their stroke as defined by mechanical abutment; in other words, at the extreme end of their stroke towards the right-hand side of FIG. 7 which corresponds to the position III illustrated in solid lines in FIG. 6.

Figure 6:
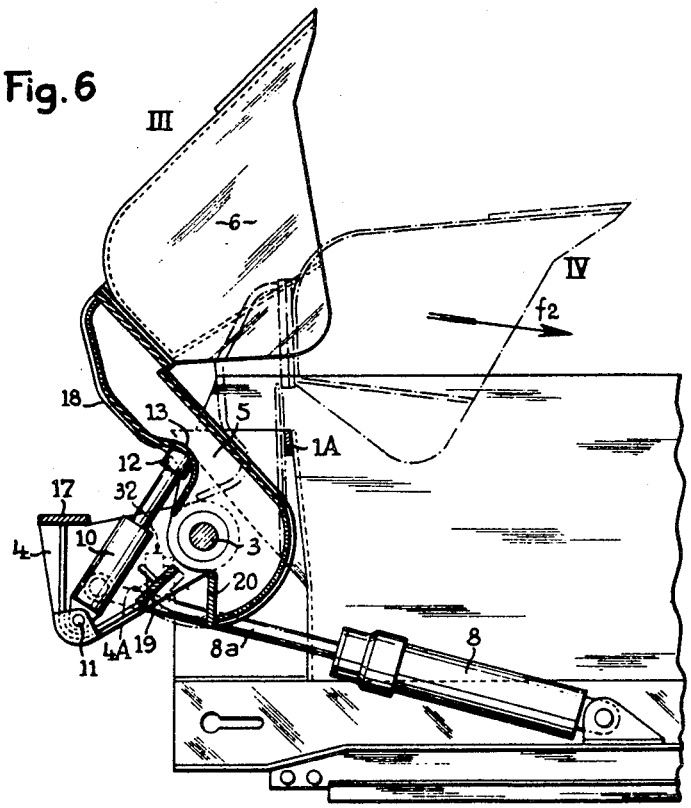
FIG. 6 is a view similar to FIGS. 1 and 5, showing the mechanism in a third and in a fourth position respectively.

The skip has thus acquired a sufficient speed which allows it to be carried along through momentum and after it has passed beyond a vertical plane containing the axis of the spindle 3, its further travel is assisted by the action of gravity until it reaches the position IV illustrated in dot-and-dash lines in FIG. 6 for which last position the arms of the skip abruptly engage the stationary stop 1A on the chassis. During this latter stage of the movement and/or under the action of the shock produced by this abrupt engagement, the load carried by the skip is hurled in the direction of the arrow f2 into the unloading hopper or other device adapted to receive said load and to feed it towards suitable means for carrying it away. The operator then ceases acting on the "UNLOAD" switch 23d which controls the electromagnet 23b of the slide valve 23. The latter returns into its neutral position A and the solenoid valve 27 returns into its closed position F.

In order to return the apparatus into its starting position, the operator presses the "RESET" button 23c which controls the electromagnet 23a of the slide valve 23 and brings the latter into the position B, which has its result to reverse the direction of the fluid passing through the pipes 25 and 26, the pipe 26 being then fed with the incoming compressed fluid. The jacks 8 are then fed with pressure fluid applied to piston surfaces which have a smaller cross-section, whereas the return flow of the spent pressure fluid is through the pipes 25. The stops 19 are brought into contact with the projections 20 on the skip arm and shift suddenly the latter back counterclockwise as viewed in FIG. 6. The skip arms then engage the ball-shaped heads or free ends 12 of the single acting jacks 10 which, under the action of the weight of the skip and of its arms, urge the spent pressure fluid towards the reservoir 22 freely through the pipes 25.

The return movement of the shovelling jacks 8 continues until the skip 6 has returned into the position I illustrated in FIG. 1.

Whenever the pressure of the oil contained in the auxiliary reservoir 28 drops below the minimum pressure for which the pressure controlled switch 37 is set, the contacts of switch 31 energize the winding 30A of solenoid valve 30 through which the pump 29 feeds the auxiliary storage container 28, until the pressure in auxiliary reservoir 28 reaches a minimum working pressure predetermined by pressure controlled switch 37, which thereafter returns to its normal position and opens the circuit controlling the electrically controlled valve 30 which sends then the oil delivered by the auxiliary pump 29 into the main reservoir 22.

Generally speaking, the pump 29 usually becomes operative during the return movement of the skip so as to restore the auxiliary reservoir 28 to its normal minimum pressure.

It will also be remarked that by reason of the suitably selected slope given to the rear surface 15 of the skip, the load of the skip is, in practice, thrown rearwardly in the direction of the arrow f2 (FIG. 6) only when the skip arms abruptly mechanically engage the stops 1A of the chassis.

My invention is by no means limited to the embodiments disclosed hereinabove and many modifications may be brought thereto without unduly widening thereby the scope of the invention as defined in the accompanying claims.

What I claim is:

1. A shovel device of the class described comprising: an elongated longitudinally displaceable chassis member; a pair of shovelling arms pivotally secured to said chassis member; angularly spaced stop means for limiting the angular displacement of said shovelling arms; a pair of skip arms pivotally secured to said chassis member and unidirectionally coupled to said shovelling arms for angular displacement therewith and therebeyond; further stop means for limiting angular displacement of said skip arms; skip means carried by said skip arms; first hydraulic jack means connected between said chassis and said shovelling arms; second hydraulic jack means connected between said shovelling arms and said skip arms; and hydraulic circuit means connected to energize said jack means simultaneously whereby said skip means is initially displaced by operation of said first jack means between said angularly spaced stop means and subsequently displaced by operation of said second jack means to the limit travel thereof and by momentum therebeyond to a position where said skip arms abruptly engage said further stop means and the contents of said skip means is thereby discharged at least in part by momentum.

2. A shovel device of the class described, comprising: an elongated longitudinally displaceable chassis member; a pair of shovelling arms pivotally connected to said chassis member for limited movement through a first angular displacement; a pair of skip arms pivotally connected to said chassis member for limited movement through a second angular displacement greater than said first displacement, said two displacements being coextensive throughout said first displacement; a skip member carried by said skip arms for receiving shovelled material therein during advancing movement of said chassis member; first hydraulic jack means connected between said chassis and said shovelling arms for moving said shovelling arms and said skip arms as a unit through said first displacement; second hydraulic jack means having a piston area smaller than the piston area of said first jack means connected between said shovelling arms and said skip arms; hydraulic circuit means connected to energize said jack means simultaneously to cause said first jack means to move said shovelling arms and said skip arms together through said first displacement and cause said second jack means to move said skip arms separately from said shovelling arms through a terminal portion of said second displacement at an increased velocity with respect to the velocity caused by said first jack means; stop means abruptly limiting the movement of said skip means at the end of said second displacement; and receiving means positioned to receive the contents of said skip means, said contents being discharged from said skip means, at least in part, by momentum acquired by said contents during movement of said skip means during said second displacement.

3. A shovel device according to claim 2, wherein said second jack means is single-acting and is unidirectionally connected to said skip arms to exert only a thrust force thereon, said skip arms being freely movable beyond the limit of travel of said second jack means for engagement with said stop means.

4. A shovel device according to claim 2, wherein said hydraulic circuit means comprises limit switch means actuable by movement of said shovelling arms to the end of said first displacement and a supplementary source of pressure fluid connected to supply said circuit means upon actuation of said limit switch means for operation of said second jack means.

5. A shovel device according to claim 2, wherein said second jack means comprises two jacks each having a piston rod terminating in a free end portion, said connection of said second jack means to said skip arms consisting in the abutment of said free end portion of one of said piston rods against a cooperating portion of one of said skip arms, said stop means being positioned to engage said skip arms after travel thereof beyond said terminal portion of said second angular displacement and at the end of said second angular displacement the center of gravity of said skip means and its contents being located above the pivotal axis of said skip arms immediately prior to engagement of said stop means by said skip arms.

6. A shovel device according to claim 2, wherein said hydraulic circuit comprises a solenoid valve having first and second operative positions and a neutral position; a reservoir; a pump connected to recirculate pressure fluid from and to said reservoir with said valve in said neutral position; first switch means connected to operate said valve to said first position, said pump being connected to energize said jack means in said first position; and further switch means connected to operate said valve to said second position, said first jack means being connected in said second position to restore said first jack means to the initial portion of said first displacement by operation of said pump, said second jack means then being connected to return spent pressure fluid freely to said reservoir by gravitational action of said skip arms and said skip.

7. A shovel device according to claim 2, wherein said hydraulic circuit means comprises a first reservoir; a first pump supplying pressure fluid to said first reservoir; a second reservoir; a second pump supplying pressure fluid to said second reservoir; pressure responsive means connected to said second reservoir and to said second pump for maintaining a predetermined minimum pressure in said second reservoir; a manually controllable valve means for connecting said first pump to energize all of said jack means simultaneously; limit switch means actuated by said shovelling arms at the end of said first displacement; and further valve means actuated by said limit switch means for connecting said second reservoir means to augment the flow of pressure fluid to said second jack means with said first jack means inoperative.

References Cited by the Examiner
UNITED STATES PATENTS

| | | | |
|---|---|---|---|
| 2,148,616 | 2/39 | Gruber. | |
| 2,427,968 | 9/47 | Hoover | 214—131 X |
| 2,469,644 | 5/49 | Harrison | 214—130 X |
| 2,729,348 | 1/56 | Hackett et al. | 214—131 |
| 2,784,853 | 3/57 | Bowles | 214—78 |
| 2,843,947 | 7/58 | Anderson, et al. | 214—140 X |
| 2,935,852 | 5/60 | Russell | 214—140 X |
| 3,037,354 | 6/62 | Tennis. | |
| 3,064,426 | 11/62 | Furia et al. | |

HUGO O. SCHULZ, *Primary Examiner.*